(12) United States Patent
Andersson

(10) Patent No.: US 7,042,561 B1
(45) Date of Patent: May 9, 2006

(54) DEVICE AND METHOD FOR ALIGNMENT

(75) Inventor: Nils Andersson, Kungsbacka (SE)

(73) Assignee: Damalini AB, Molndal (SE)

( * ) Notice: Subject to any disclaimer, the term of this patent is extended or adjusted under 35 U.S.C. 154(b) by 0 days.

(21) Appl. No.: 09/437,908

(22) Filed: Nov. 9, 1999

(30) Foreign Application Priority Data

Nov. 10, 1998 (SE) ............................................. 9803851

(51) Int. Cl.
*G01B 11/26* (2006.01)
*G01B 11/00* (2006.01)

(52) U.S. Cl. ...................................... 356/153; 356/399
(58) Field of Classification Search ................. 356/399, 356/400, 138, 139, 139.03, 141.3, 142; 33/228, 33/286, 293, 227, DIG. 1, DIG. 21
See application file for complete search history.

(56) References Cited

U.S. PATENT DOCUMENTS

| | | | |
|---|---|---|---|
| 1,602,698 A | 10/1926 | Nielsen | |
| 2,714,255 A | 8/1955 | Glazer | |
| 3,901,604 A | 8/1975 | Butler | |
| 4,130,362 A | * 12/1978 | Lill et al. | ............. 356/139.09 |
| 4,249,294 A | 2/1981 | Belfiore | |
| 4,375,130 A | * 3/1983 | Lill | ............. 33/228 |
| 4,578,870 A | 4/1986 | Cooke | |
| 4,709,485 A | 12/1987 | Bowman | |
| 4,804,270 A | 2/1989 | Miller | |
| 4,898,468 A | 2/1990 | Udd | |
| 5,026,998 A | 6/1991 | Holzl | |
| 5,054,918 A | 10/1991 | Downing et al. | |
| 5,095,629 A | 3/1992 | Klemer et al. | |
| 5,233,761 A | * 8/1993 | Guaraldi et al. | ............. 101/485 |
| 5,402,226 A | 3/1995 | Matthews et al. | |
| 5,430,539 A | 7/1995 | Lysen | |
| 5,689,545 A | 11/1997 | Hopkins | |
| 5,741,096 A | 4/1998 | Olds | |
| 5,742,394 A | 4/1998 | Hansen | |
| 5,760,938 A | 6/1998 | Hodge | |
| 5,987,762 A | 11/1999 | Toth et al. | |
| 6,031,616 A | * 2/2000 | Seiffert | ............. 356/399 |
| 6,082,011 A | * 7/2000 | Phillips, III | ............. 33/203.15 |
| 2003/0051354 A1 | 3/2003 | Segerstrom et al. | |

FOREIGN PATENT DOCUMENTS

| | | |
|---|---|---|
| DE | 2839531 | 3/1980 |
| EP | 0 405771 | 8/1994 |
| EP | 0 806 630 | 12/1997 |
| EP | 0 854 351 | 7/1998 |
| GB | 2 128 324 A | 4/1984 |
| GB | 2 329 019 | 3/1999 |
| JP | 3-88678 | 9/1991 |
| JP | 06-051050 | 2/1994 |
| WO | WO 91/14922 | 10/1991 |

OTHER PUBLICATIONS

Battery Powered Laser FL 4/2, , pages(s) 1–3.
Combi–Laser alignment system, , pages(s) 1–6.
Imatronic Catalog.
Model 1142XL and IL LaserLevel Operators Manual, Spectra–Physics, , pages(s) 1.1–10.3.
Combi–Laser training at Fixturlaser 960506–960510, 1998, Publisher: Fixturlaser AB, Published in: Sweden.
1984–85 Laser Alignment Systems, 1984, Publisher: Optikon Corporation Ltd., Published in: Ontario, Canada.
Hamar, M, Laser Alignment–Current Uses and Applications, Publisher: Society of Manufacturing Engineers, 1974.
Hamar, M, Laser Alignment in Industry, , Publisher: American Society of Tool and Manufacturing Engineers, 1968.
Josam Laser , Hosam Laser AM Brochure, 1990.
Pinpoint Laser Systems, Microgage 1000 Brochure, 1998.

* cited by examiner

*Primary Examiner*—Layla G. Lauchman
(74) *Attorney, Agent, or Firm*—Oppedahl & Larson LLP

(57) ABSTRACT

The present invention refers to a system and a device (10) for alignment of at least one alignable plane with reference to at least one reference plane. The device includes a main part (11), a light source (18) and a number of contact points (21*a*, 21*b*, 21*c*), and the light source (18) is provided to emit a light beam (25) with a scattering angle in one plane.

79 Claims, 2 Drawing Sheets

DEVICE AND METHOD FOR ALIGNMENT

TECHNICAL FIELD OF THE INVENTION

The present invention relates to a device for alignment of at least one alignable plane with respect to at least one reference plane.

The invention also refers to a system and a method for alignment of at least one alignable plane with respect to at least one reference plane.

BACKGROUND OF THE INVENTION

Usually, at power transmission between rotary shafts, for example via belt or sheave, it is required that the driving and the driven wheels are mutually, at least plane-parallel and adjusted axially in line with each other. This is mainly to prevent abnormal wear of the belts or chains arranged in the power transmission.

Presently, string and straight edges are used when aligning sheave/gear wheels. The string and straight edge is manually provided on the axial plane defined by the side of one of the wheels. The string and straight edge are then held in such a direction that the distance to the axial plane defined by the side of the other wheel can be estimated. This gives, however, only an estimation of the mutual position and the point of the wheels in one direction, whereby the string and straight edge are turned to a new position on the other wheel and a new estimation of the distance between ruler and wheel can be obtained. This distance is compared to the first one in order to obtain an estimation of the mutual position and the direction of the wheel in the other direction. This method, which prevents a simultaneous alignment of the wheels by one operator and the fact that the string and straight edge must be of such a length that they fit the periphery of both wheels makes the alignment become time consuming and inaccurate.

Moreover, alignment with a string and straight edge is normally done by two mechanics.

The Object of the Invention and the Most Important Characteristics

The object of the present invention is to provide a simple and cost-effective device which allows simple and quick adjustment and alignment of at least two essentially plane surfaces. The substantially visible light beam used for the alignment shows the parallel and angular misalignment directly.

A further object of the invention is to provide a device mainly intended for adjustments of sheaves/gear wheels in power transmission systems having rotary shafts, preferably through optical measurement, in industrial environment and a corresponding measurement method.

Through the teachings of the invention, the alignment results in reduced vibration, extended life of belt and sheaves, proper belts tensioning and also eliminated downtime and production delays.

Above mentioned objects are achieved by means of the initially mentioned device, comprising a main part, a light source and a number of contact points, and that the light source is arranged to emit a light beam with a scattering angle in one plane.

Advantageously the contact points are displaceable and also arranged as attachment devices.

In one preferred embodiment the light beam has a scattering plane essentially parallel to the alignable plane.

In one most preferred embodiment the device comprises an arm. The arm and the main part are rotatable relative each other. Furthermore, the arm is provided with at least one contact point. Preferably, the contact points are arranged displaceable relative each other and/or relative the device. The contact points are arranged to take optional positions in a plane, area of which is only limited by the physical dimensions of the device, that these contact points independently of position, allow the device to transfer the position and direction from the reference plane in two opposite each other essentially perpendicular coordinates.

The system according to the invention comprises a device consisting of a main part, a light source and a number of contact points. The light source is arranged to emit a light beam with a scattering angle in one plane. The system also includes an indicator device to be arranged on the alignable plane.

Suitably, said light beam has a scattering plane essentially parallel to the alignable plane. Preferably, the indicator device consists of a part for attachment and a body provided with a measurement mark. According to the system alignment is achieved when the light beam essentially coincides with the measurement mark. Preferably, at least three indicator devices are arranged on said plane. In one embodiment, the indicator device is part of said plane.

According to a method of the invention for alignment of at least one alignable plane with respect to at least one reference plane so that said planes become essentially plane-parallel, a device is arranged consisting of a main part, a light source and a number of contact points, a light beam is emitted with a scattering angle in one plane, an indicator device is arranged on the alignable plane within the area of the light beam provided with measurement mark, and with respect to the measuring mark adjust the alignable plane is adjusted so that the mark coincides with the intersectional line between the light beam and the indicator device.

BRIEF DESCRIPTION OF THE DRAWINGS

In the following, the invention will be described in greater detail with reference to a non-limiting embodiment shown in attached drawings, in which.

DETAILED DESCRIPTION OF THE INVENTION

Figure 1:
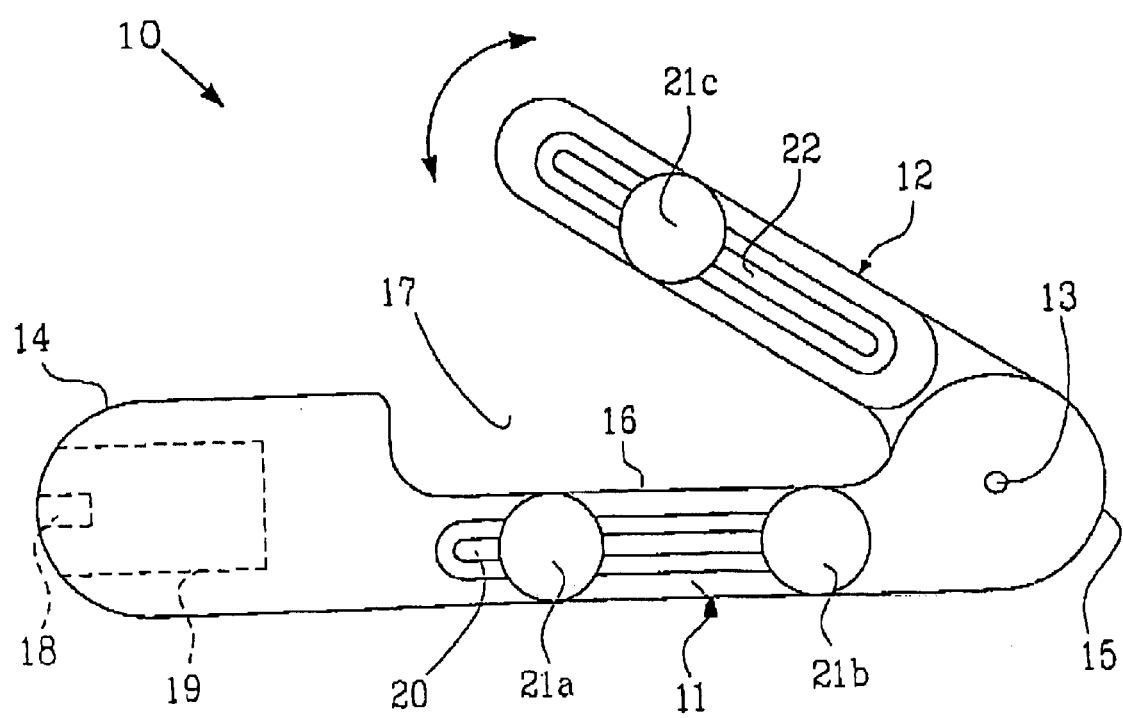
FIG. 1 is a schematic lateral view of an alignment device, according to the invention.

A preferred embodiment of an alignment device, according to the invention is shown in FIG. 1. The device 10 comprises a main part 11 and an arm 12. The main part 11 and the arm 12 are rotatably arranged relative each other around an axis 13.

The main part is essentially designed with a first end 14 and a second end 15 connected to each other via a neck 16, which also form an accommodation space 17. The main part 11 further comprises a light source 18 and a possible driving unit 19, optical elements and source of energy (not shown) arranged in a space in the first end 14. The second end is arranged with a journal 13, which pivotally connects the main part 11 to the arm 12. In the neck section 16 the main part is provided with a recess 20, which in this embodiment carries two attachment devices 21a and 21b displaceable relative to the main part. The space 17 is provided to receive the arm 12 when it is rotated therein, which for instance facilitates the handling and the storage of the device.

The arm 12 is also provided with a recess 22 in the direction of its longitudinal axis, which also carries an attachment device 21c displaceable in the recess 22.

Preferably, the attachment devices 21a, 21b and 21c consist of magnets in one end, which can be fixed in the recess by means of a locking device (not shown) for example a nut or the like in a known way. Other additional attachment devices, for example different types of fastening means, suction cups, means for adhesion etc. may also be used. It is also possible to provide separate attachment means and contact points.

Preferably, the light source 18 consists of a laser emitting device, for example a laser diode, but other light sources may also be used. By means of for example optical elements (not shown) the light beam from the light source can be scattered, preferably essentially parallel to that/those planes that must be aligned. The driving unit can also be controlled by means of a switch arranged in the main part (not shown).

Figure 2:
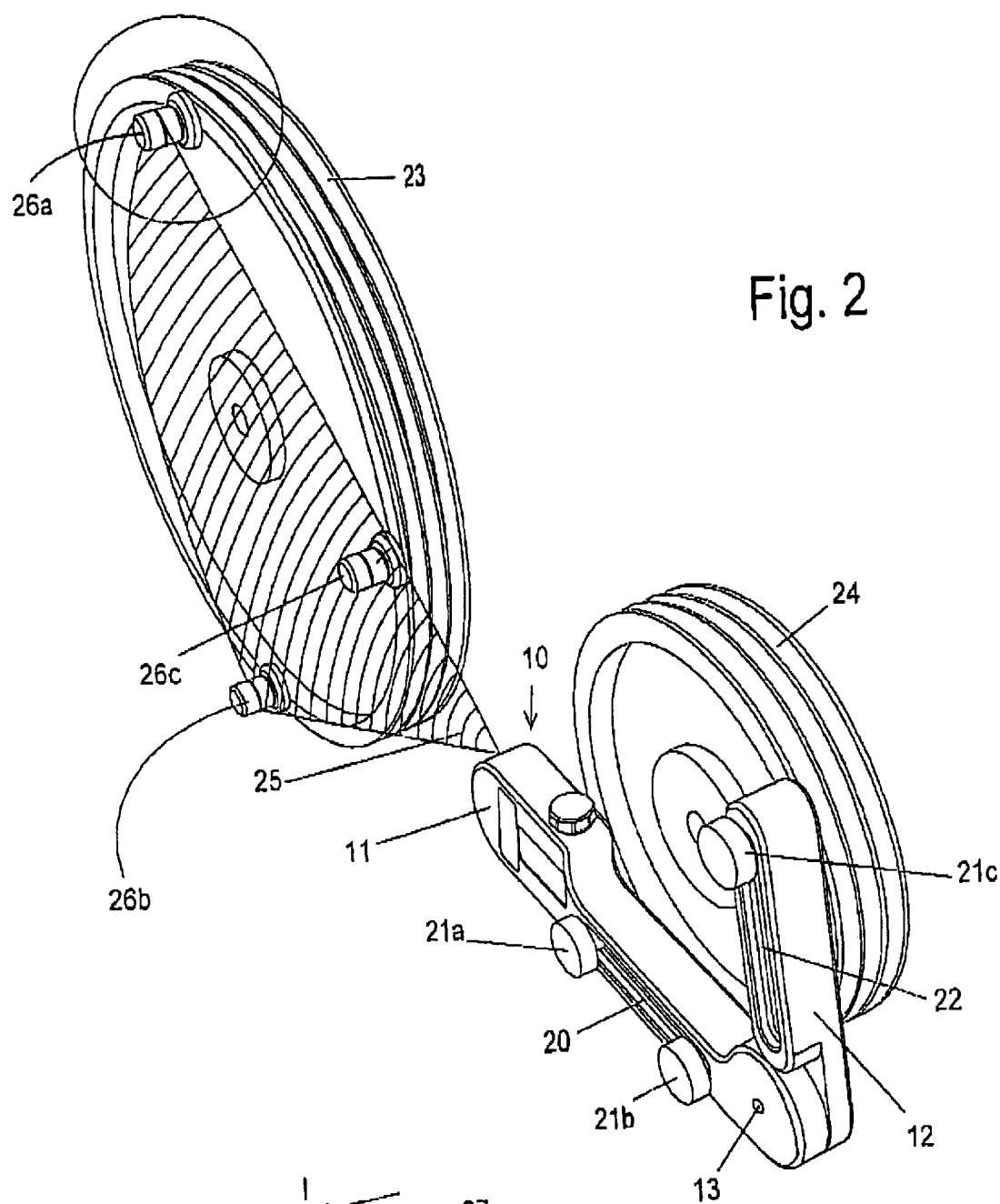
FIG. 2 shows a schematic view in perspective of an application using the device shown in FIG. 1.

An application for alignment and adjustment of two sheaves 23 and 24 is shown in FIG. 2. A light beam 25 is emitted from the light source 18. This light beam 25 is formed with a relatively large scattering angle in one direction and a very small scattering angle in remaining directions and creates along its extension a plane of light (essentially parallel to the plane of the wheels).

The device 10 with the arm 12 is fastened on a reference part which normally consists of one of the two sheaves 23, 24, for example in a belt transmission. The device is fastened by means of the three attachment devices (or contact points) 21a, 21b and 21c provided with magnets, which take optional positions and are distributed in as great a mutual distance as possible and bear on the surface situated close to the periphery of the reference sheave 24. This distributing is enabled through the recesses 20 and 22, and also through the mutual articulated features of the arm 12 and the main part 11 around the axis 13. The plane that the attachment device forms is limited only by the area of the physical dimensions of the device. These contact points independent of position, allow the device 10 to transfer from the reference plane the position and direction in two to each other essentially perpendicular coordinates.

The function of the magnets is now partly to fasten the device onto the reference plane and partly to transfer the position and direction of the reference plane to the light beam 25.

Figure 3:
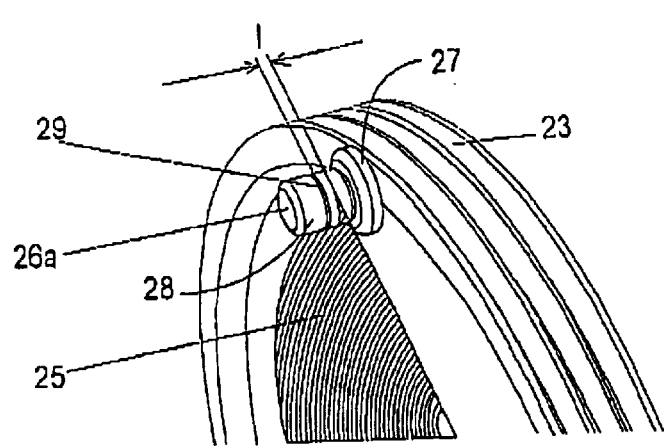
FIG. 3 shows the encircled section of FIG. 2 in greater detail.

On the other sheave 23 a number of indicator devices 26 are arranged. According to the present, preferred embodiment three indicator devices 26a, 26b and 26c are provided. Each indicator device, of which one is shown in greater detail in FIG. 3, includes an attachment device 27, a body and a reference mark 29 arranged on the body. The attachment device 27 may consist of a magnet or the like. The distance between the mark 29 and the end fixed to the object to be measured of the indicator device preferably corresponds to the distance between the scattering plane of the light beam and the end of the attachment device, which contacts the reference plane.

When aligning, the light beam 25 is brought to encounter the indicator device 26a, 26b and 26c placed on the measured object 232, i.e. the other of the two sheaves in the belt transition. Because of the essentially great scattering angle of the light beam and the distance to the object to be measured a simultaneous strike of all the indicator devices is enabled. Each mark 29 on each indicator device has a fixed distance from the measuring object 10 and when it is adjusted so that the light beam 25 essentially encounters the centre of these marks 29, the measured object 23 is plane-parallel to and in line with the reference 24. The non plane-parallelism of measured object 23 results in a distance I between the mark 29 and the point of impact of the light beam (FIG. 3) on each individual indicator device. Plane-parallelism exists when l=0 (or l=0) at each indicator device and the intersectional line of the light beam essentially coincide with the mark 29.

In one embodiment the indicator devices may consist of sensors, which are able to sense the light beam. Preferably the adjustment of the object to be measured can be done automatically so that it is placed plane-parallel with the reference object. Suitably, this can be achieved continuously. In one embodiment a part of the object to be measured may be provided with a reference mark, which is used instead of the indicator devices.

By adjusting the object to be measured 23, advantageously both in axial and radial directions, plane-parallelism is achieved between the sheaves.

While we have illustrated and described a preferred embodiment, according to the invention, it is realized that variations and modifications within the scope of the attached claims may exist. The invention may advantageously be used in all applications where two objects must be aligned plane-parallel or essentially plane-parallel. These objects may also comprise of, for example walls, tabletops, glass, ceilings etc. The design of the device may also be varied by arranging it with three or more arms, or a fixed body provided with a number of recesses in different directions carrying displaceable attachment devices.

Furthermore, the reference marks of the indicator devices may be arranged in the longitudinal direction of the body, whereby plane-parallelism is achieved when an essentially right-angled cross with respect to the intersectional line of the light beam is obtained. Even the light beam may be emitted in the longitudinal direction of the indicator device whereby the reference mark may be arranged along its longitudinal direction or opposite its longitudinal direction.

What we claim is:

1. A system for an essentially plane-parallel alignment of a first plane with reference to a second plane, wherein the system comprises:

(a) a device comprising a main part and a light source and a plurality of contact points, wherein said contact points are connected to the main part and disposed to attach the main part to the first plane, and said light source is connected to the main part of the device in a position to emit a scattered light beam said scattered light beam having a first scattering angle in one direction, and smaller scattering angles in other directions, whereby the scattered light beam is in a scattering plane, wherein the scattering plane is essentially parallel to the plane of the first plane when it is attached to the device via the contact points; and (b) an indicator device to be arranged on the second plane.

2. The system of claim 1, comprising at least three indicator devices.

3. A method for alignment of a first plane with reference to a second plane so that said planes become essentially plane-parallel, wherein the method comprises the steps of:

(a) attaching to the first plane an alignment device comprising a main part, a light source and a plurality contact points, wherein said contact points are connected to the main part and disposed to attach the main part to the first plane, and said light source is connected to the main part of the device in a position to emit a light beam with a scattering angle in a scattering plane, wherein the scattering plane is essentially parallel to the plane of the first plane when plane attached to the device via the contact points;

(b) generating a light beam from the light source;

(c) arranging indicator devices provided with measurement marks on the second plane within an area illuminated by the light beam; and (d) adjusting the second plane with regard to said measurement marks so that each mark coincides with an intersectional line between the light beam and the indicator device.

4. The method according to claim 3, wherein the first and second planes are selected independently selected from the group consisting of pulleys, wheels and walls.

5. The method of claim 4, wherein the indicator device comprises a part for attachment and a body provided with at least one indicator.

6. The method according to claim 3, wherein both the first and second plane are a pulley.

7. The method of claim 3, wherein the indicator device comprises a part for attachment and a body provided with at least one indicator.

8. The method of claim 3, wherein at least three indicator devices are arranged on the second plane.

9. The method of claim 3, wherein the indicator device is part of said second plane.

10. The method according to claim 9, wherein the first and second planes are selected independently selected from the group consisting of pulleys, wheels and walls.

11. The method according to claim 9, wherein both the first and second plane are a pulley.

12. The method of claim 3, wherein said alignment device comprises an arm, rotatably attached to said main part, said arm having at least one contact point for attachment of the first plane disposed thereon.

13. The method of claim 3, wherein said contact points are moveable between different positions in a plane defined by the physical dimensions of the device, the contact points, independent of position, allowing the device to transfer a position and direction from the attached first plane in two directions that are essentially mutually perpendicular.

14. The system of claim 1, wherein the contact points are disposed on a face of the main body that is essentially parallel to the scattering plane such that said face is essentially parallel to the first plane when the device is attached to the first plane.

15. The system of claim 2, wherein the contact points are disposed on a face of the main body that is essentially parallel to the scattering plane such that said face is essentially parallel to the first plane when the device is attached to the first plane.

16. The system of claim 15, wherein the part for attachment of the indicator device is attachable to the second plane such that the indicator marks are disposed in a plane parallel to but separated from the second plane when the indicator devices are attached to the second plane.

17. The system of claim 2, wherein the part for attachment of the indicator device is attachable to the second plane such that the indicator marks are disposed in a plane parallel to but separated from the second plane when the indicator devices are attached to the second plane.

18. The method of claim 3, wherein the contact points are disposed on a face of the main body that is essentially parallel to the scattering plane such that said face is essentially parallel to the first plane when the device is attached to the first plane.

19. The method of claim 5, wherein the part for attachment of the indicator device is attachable to the second plane such that the indicator marks are disposed in a plane parallel to but separated from the second plane when the indicator devices are attached to the second plane.

20. The method of claim 5, wherein the contact points are disposed on a face of the main body that is essentially parallel to the scattering plane such that said face is essentially parallel to the first plane when the device is attached to the first plane.

21. The method of claim 20, wherein the part for attachment of the indicator device is attachable to the second plane such that the indicator marks are disposed in a plane parallel to but separated from the second plane when the indicator devices are attached to the second plane.

22. The method of claim 12, wherein the contact points are disposed on a face of the main body that is essentially parallel to the scattering plane such that said face is essentially parallel to the first plane when the device is attached to the first plane.

23. The method of claim 22, wherein the part for attachment of the indicator device is attachable to the second plane such that the indicator marks are disposed in a plane parallel to but separated from the second plane when the indicator devices are attached to the second plane.

24. The system of claim 1, wherein the contact points are magnets.

25. The system of claim 24, wherein the contact points are disposed on a face of the main body that is essentially parallel to the scattering plane such that said face is essentially parallel to the first plane when the device is attached to the first plane.

26. The method of claim 3, wherein the contact points are magnets.

27. The method of claim 26, wherein the contact points are disposed on a face of the main body that is essentially parallel to the scattering plane such that said face is essentially parallel to the first plane when the device is attached to the first plane.

28. The system of claim 1, wherein the indicator device comprises a sensor which is able to sense the scattered light beam.

29. The system of claim 1, wherein the indicator device comprises a measurement mark.

30. The device of claim 1, wherein the light is a laser.

31. The device of claim 3, wherein the light is a laser.

32. An alignable pulley system comprising:

(a) first and second pulleys;

(b) an alignment device comprising a main part, a light source and a plurality contact points, wherein said contact points are connected to the main part and disposed to attach the main part to the first pulley, and said light source is connected to the main part of the device in a position to emit a scattering light beam said scattered light beam having a first scattering angle in one direction, and smaller scattering angles in others directions, whereby the scattered light beam is in a scattering plane, wherein the scattering plane is essentially parallel to the plane of the first pulley when the first pulley is attached to the device via the contact points; and (c) an indicator device.

33. The pulley system of claim 32, wherein the contact points are disposed on a face of the main body that is essentially parallel to the scattering plane such that said face is essentially parallel to the first plane when the device is attached to the first plane.

34. The pulley system of claim 33, wherein the indicator devices each comprise a part for attachment and a body provided with at least one indicator.

35. The pulley system of claim 34, wherein the part for attachment of the indicator device is attachable to the second plane such that the indicator marks are disposed in a plane parallel to but separated from the second plane when the indicator devices are attached to the second plane.

36. The pulley system of claim 32, wherein the contact points are disposed on a face of the main body that is essentially parallel to the scattering plane such that said face is essentially parallel to the first plane when the device is attached to the first plane.

37. The pulley system of claim 36, wherein the indicator devices each comprise a part for attachment and a body provided with at least one indicator.

38. The pulley system of claim 37, wherein the part for attachment of the indicator device is attachable to the second plane such that the indicator marks are disposed in a plane parallel to but separated from the second plane when the indicator devices are attached to the second plane.

39. The pulley system of claim 32, wherein the indicator devices each comprise a part for attachment and a body provided with at least one indicator.

40. The pulley system of claim 39, wherein the parts for attachment of the indicator devices are attached to the second plane such that the indicator marks are disposed in a plane parallel to but separated from the second plane.

41. The pulley system of claim 32, wherein the contact points are magnets.

42. The pulley system of claim 41, wherein the contact points are disposed on a face of the main body that is essentially parallel to the scattering plane such that said face is essentially parallel to the first plane when the device is attached to the first plane.

43. The pulley system of claim 32, wherein the indicator device comprises a sensor which is able to sense the scattered light beam.

44. The pulley system of claim 32, wherein the indicator device comprises a measurement mark.

45. The device of claim 32, wherein the light is a laser.

46. An alignable pulley system comprising:
   (a) first and second pulleys;
   (b) an alignable device comprising a main part, a light source and a plurality contact points, wherein said contact points are connected to the main part and disposed to attach the main part to the first pulley, and said light source is connected to the main part of the device in a position to emit a light beam with a scattering angle in a scattering plane, wherein the scattering plane is essentially parallel to the plane of the first pulley when the first pulley is attached to the device via the contact points; and
   (c) a plurality of indicator devices provided with measurement marks.
wherein the alignment device further comprises an arm, rotatably attached to said main part, said arm having at least one contact point for attachment of the first pulley disposed thereon.

47. A device for alignment of a first plane with reference to a second plane, said device comprising a main part, a light source and a plurality of contact points, wherein said contact points are connected to the main part and disposed to attach the main part to said first plane, and said light source is connected to the main part of the device in a position to emit a light beam with a scattering angle in a scattering plane, wherein the scattering plane is essentially parallel to the plane of the first plane when it is attached to the device via the contact points, wherein said contact points are displaceable relative to each other and/or to the main body.

48. A device for alignment of a first plane with reference to a second plane, said device comprising a main part, a light source and a plurality of contact points, wherein said contact points are connected to the main part and disposed to attached the main part to said first plane, and said light source is connected to the main part of the device in a position to emit a light beam with a scattering angle in a scattering plane, wherein the scattering plane is essentially parallel to the plane of the first plane when it is attached to the device via the contact points, further comprising an arm, rotatably connected to said main part.

49. The device of claim 48, wherein said arm is provided with at least one contact point.

50. A device for alignment of a first plane with reference to a second plane, said device comprising a main part, a light source and a plurality of contact points, wherein said contact points are connected to the main part and disposed to attach the main part to said first plane, and said light source is connected to the main part of the device in a position to emit a light beam with a scattering angle in a scattering plane, wherein the scattering plane is essentially parallel to the plane of the first plane when it is attached to the device via the contact points, wherein said contact points are moveable between different positions in a plane defined by the physical dimensions of the device, the contact points, independent of position, allowing the device to transfer a position and direction from the first plane in two directions that are essentially mutually perpendicular.

51. A system for alignment of a first plane with reference to a second plane, wherein the system comprises:
   (a) a device comprising a main part and a light source and a plurality of contact points, wherein said contact points are connected to the main part and disposed to attach the main part to the first plane, and said light source is connected to the main part of the device in a position to emit a light beam with a scattering angle in a scattering plane, wherein the scattering plane is essentially parallel to the plane of the first plane when it is attached to the device via the contact points; and
   (b) indicator devices to be arranged on the second plane, wherein the indicator devices each comprise a part for attachment and a body provided with a measurement mark.

52. The system of claim 51, wherein the part for attachment of the indicator device is attachable to the second plane such that the indicator marks are disposed in a plane parallel to but separated from the second plane when the indicator devices are attached to the second plane.

53. The system of claim 51, wherein the contact points are disposed on a face of the main body that is essentially parallel to the scattering plane such that said face is essentially parallel to the first plane when the device is attached to the first plane.

54. The system of claim 53, wherein the part for attachment of the indicator device is attachable to the second plane such that the indicator marks are disposed in a plane parallel to but separated from the second plane when the indicator devices are attached to the second plane.

55. An alignable pulley system comprising:
   (a) first and second pulleys;
   (b) an alignment device comprising a main part, a light source and a plurality contact points, wherein said contact points are connected to the main part and disposed to attach the main part to the first pulley, and said light source is connected to the main part of the device in a position to emit a light beam with a scattering angle in a scattering plane, wherein the scattering plane is essentially parallel to the plane of the first pulley when the first pulley is attached to the device via the contact points; and (c) a plurality of indicator devices provided with measurement marks, wherein the indicator devices are affixed to the second pulley.

56. A method for alignment of a first plane with reference to a second plane so that said planes become essentially plane-parallel, wherein the method comprises the steps of:

(a) attaching to the first plane an alignment device comprising a main part, a light source and a plurality of contact points, wherein said contact points are connected to the main part and disposed to attach the main part to the first plane, and said light source is connected to the main part of the device in a position to emit a scattered light beam said scattered light beam having a first scattering angle in one direction, and smaller scattering angles in others directions, whereby the scattered light beam is in a scattering plane, wherein the scattering plane is essentially parallel to the plane of the first plane when it is attached to the device via the contact points;

(b) generating a scattered light beam from the light source.

(c) arranging indicator devices provided with measurement marks on the second plane within an area illuminated by the light beam; and (d) adjusting the second plane with regard to said measurement marks so that each mark coincides with an intersectional line between the light beam and the indicator device.

57. The method according to claim 56, wherein the first and second planes are selected independently selected from the group consisting of pulleys, wheels and walls.

58. The method of claim 57, wherein the indicator device comprises a part for attachment and a body provided with at least one indicator.

59. The method according to claim 56, wherein both the first and second plane are a pulley.

60. The method of claim 56, wherein the indicator device comprises a part for attachment and a body provided with at least one indicator.

61. The method of claim 56, wherein at least three indicator devices are arranged on the second plane.

62. The method of claim 56, wherein the indicator device is part of said second plane.

63. The method of claim 62, wherein the first and second planes are selected independently selected from the group consisting of pulleys, wheels and walls.

64. The method according to claim 62, wherein both the first and second plane are a pulley.

65. The method of claim 56, wherein said alignment device comprises an arm, rotatably attached to said main part, said arm having at least one contact point for attachment of the first plane disposed thereon.

66. The method of claim 56, wherein said contact points are moveable between different positions in a plane defined by the physical dimensions of the device, the contact points, independently of position, allowing the device to transfer a position and direction from the attached first plane in two directions that are essentially mutually perpendicular.

67. The method of claim 56, wherein the contact points are disposed on a face of the main body that is essentially parallel to the scattering plane such that said face is essentially parallel to the first plane when the device is attached to the first plane.

68. The method of claim 58, wherein the part for attachment of the indicator device is attachable to the second plane such that the indicator marks are disposed in a plane parallel to but separated from the second plane when the indicator devices are attached to the second plane.

69. The method of claim 58, wherein the contact points are disposed on a face of the main body that is essentially parallel to the scattering plane such that said face is essentially parallel to the first plane when the device is attached to the first plane.

70. The method of claim 69, wherein the part for attachment of the indicator device is attachable to the second plane such that the indicator marks are disposed in a plane parallel to but separated from the second plane when the indicator devices are attached to the second plane.

71. The method of claim 65, wherein the contact points are disposed on a face of the main body that is essentially parallel to the scattering plane such that said face is essentially parallel to the first plane when the device is attached to the first plane.

72. The method of claim 71, wherein the part for attachment of the indicator device is attachable to the second plane such that the indicator marks are disposed in a plane parallel to but separated from the second plane when the indicator devices are attached to the second plane.

73. The method of claim 56, wherein the contact points are magnets.

74. The method of claim 73, wherein the contact points are disposed on a face of the main body that is essentially parallel to the scattering plane such that said face is essentially parallel to the first plane when the device is attached to the first plane.

75. The device of claim 56, wherein the light is a laser.

76. The pulley system of claim 55, wherein the indicator devices each comprise a part for attachment and a body provided with at least one indicator.

77. The pulley system of claim 76, wherein the parts for attachment of the indicator devices are attached to the second plane such that the indicator marks are disposed in a plane parallel to but separated from the second plane.

78. The pulley system of claim 77, wherein the contact points are disposed on a face of the main body that is essentially parallel to the scattering plane such that said face is essentially parallel to the first plane when the device is attached to the first plane.

79. The pulley system of claim 76, wherein the contact points are disposed on a face of the main body that is essentially parallel to the scattering plane such that said face is essentially parallel to the first plane when the device is attached to the first plane.

* * * * *